United States Patent
Tabayashi

(10) Patent No.: US 8,888,241 B2
(45) Date of Patent: Nov. 18, 2014

(54) PRINTING APPARATUS AND METHOD OF PRINTING USING AN INK JET METHOD WITH RESPECT TO A MEDIUM

(71) Applicant: Mimaki Engineering Co., Ltd., Nagano (JP)

(72) Inventor: Isao Tabayashi, Nagano (JP)

(73) Assignee: Mimaki Engineering Co., Ltd., Nagano (JP)

( * ) Notice: Subject to any disclaimer, the term of this patent is extended or adjusted under 35 U.S.C. 154(b) by 0 days.

(21) Appl. No.: 14/188,692

(22) Filed: Feb. 25, 2014

(65) Prior Publication Data
US 2014/0247298 A1    Sep. 4, 2014

(30) Foreign Application Priority Data
Mar. 1, 2013  (JP) .................. 2013-040335

(51) Int. Cl.
*B41J 2/21*    (2006.01)

(52) U.S. Cl.
CPC ... *B41J 2/21* (2013.01); *B41J 2/211* (2013.01)
USPC ............ 347/43; 347/9; 347/15; 347/16

(58) Field of Classification Search
CPC ............................. B41J 2/21; B41J 2/211
USPC ................... 347/9, 15, 40–43, 16
See application file for complete search history.

(56) References Cited

U.S. PATENT DOCUMENTS 7,798,602 B2 *  9/2010  Kobayashi et al. ............. 347/37

FOREIGN PATENT DOCUMENTS

| JP | 08-209553 | 8/1996 |
|---|---|---|
| JP | 2012-044475 | 3/2012 |

* cited by examiner

*Primary Examiner* — Juanita D Jackson
(74) *Attorney, Agent, or Firm* — Jianq Chyun IP Office

(57) ABSTRACT

A printing apparatus in which printing is performed using an ink jet method includes a first ink jet head that discharges ink droplets of ink of a first color which is a color of the same color type as an expression color that is set in advance, a second ink jet head that discharges ink droplets of ink of a second color which is a color of the same color type as the expression color and is different from the first color, and a control unit which makes the first and the second ink jet head perform printing with the expression color on a medium by setting a ratio of a discharge amount of ink of the first color by the first ink jet head to a discharge amount of ink of the second color by the second ink jet head to a discharge rate which is calculated in advance.

20 Claims, 3 Drawing Sheets

PRINTING APPARATUS AND METHOD OF PRINTING USING AN INK JET METHOD WITH RESPECT TO A MEDIUM

CROSS REFERENCE TO RELATED APPLICATION

This application claims the priority benefit of Japanese application serial no. 2013-040335, filed on Mar. 1, 2013. The entirety of the above-mentioned patent application is hereby incorporated by reference herein and made a part of specification.

TECHNICAL FIELD

The present disclosure relates to a printing apparatus and a method of printing using an ink jet method with respect to a medium.

BACKGROUND

In recent years, an ink jet printer in which printing is performed using an ink jet method has been widely used. In the ink jet printer, color printing is usually performed by using inks of a combination of a cyan color (C), a magenta color (M), a yellow color (Y) and a black color (K) which could be referred to as CMYK. In addition, as to a configuration in which color printing is performed in the related art, a method of performing various adjustments in order to perform printing with the desired color has been proposed (for example, refer to JP-A-2012-44475).

In addition, since the ink jet printer is capable of performing printing in a state of non-contact with a surface to be printed of a medium, printing can be performed with respect to the media of various materials. For example, performing printing on leather by the ink jet printer has been studied in the related art (for example, refer to JP-A-08-209553).

SUMMARY OF THE DISCLOSURE

The present disclosure could be summarized as these following configurations to be described below. However, it should be understood that this summary may not contain all of the aspect and embodiments of the present disclosure and also is not meant to be limiting or restrictive in any manner. Furthermore, the present disclosure would include improvements and modifications which are obvious to one skilled in the art.

Configuration 1

According to an aspect of the present disclosure, there is provided a printing apparatus that performs printing using an ink jet method with respect to a medium, including a first ink jet head that discharges ink droplets of ink of a first color which is a color of the same color type as an expression color which is a color that is set as a color to be expressed by printing in advance, a second ink jet head that discharges ink droplets of ink of a second color which is a color of the same color type as the expression color and is different from the first color, and a control unit that controls the discharge of ink droplets by each of the first ink jet head and the second ink jet head, in which the control unit makes the first ink jet head and the second ink jet head perform printing with the expression color on the medium by setting a ratio of a discharge amount of discharging ink of the first color by the first ink jet head on the medium to a discharge amount of discharging ink of the second color by the second ink jet head on the medium to a discharge rate which is calculated in advance.

In a case of configuring in this manner, for example, it is possible to appropriately perform the adjustment of color which is printed on the medium by using inks of the first color and the second color which are different from each other. In addition, as to the discharge rate of the first ink jet relative to the second ink jet, for example, it is possible to appropriately match the color printed on the medium with the desired expression color by setting to the discharge rate calculated in advance based on the color of the medium or a result of a test printing.

Furthermore, it is possible to appropriately perform the adjustment of the color which is printed on the medium with higher accuracy by using inks of the first color and the second color of the same color type as the desired expression color, compared with a case of using inks of plural colors of the completely different system, for example, as CMYK inks. Therefore, by configuring in this manner, for example, it is possible to appropriately perform printing with the desired expression color with high accuracy.

In addition, in this case, for example, even in a case of using the media of various colors or textures, it is possible to appropriately adjust the colors on the media in accordance with the colors or textures of the media. In addition, in doing so, for example, it is possible to appropriately perform printing in which the colors or the textures of the media are retained.

In addition, in this case, since ink of a color originally close to the expression color is used, for example, even if an area which is printed is enlarged and observed, an impression in which the dots of inks of other colors are lined up is not likely to occur. Therefore, even in a case of observing the state from the adjacent position, it is possible to give an impression in which printing is appropriately performed with the expression color.

In addition, in a case of configuring in this manner, since the first color and the second color are close, for example, even if the order in which the dots of ink are overlapped is different, an effect on the observed color becomes small. Therefore, for example, even if printing is performed in both the going path and the returning path of the main scanning operation (the scanning operation), it is possible to appropriately suppress an effect which occurs on the observed color. Furthermore, in a case where the first color and the second color are close, for example, even if each ink is mixed on the medium, an impression of bleeding or the like is not likely to occur. In addition, as a result, for example, even if the dots of ink are sufficiently flattened (smoothed), a problem of bleeding is not likely to occur. Therefore, by configuring in this manner, for example, the dots of ink are sufficiently flattened and thus it also becomes possible to appropriately perform printing with gloss feeling, or the like.

Moreover, in this configuration, the discharge rate of the discharge amount by the first ink jet head to the discharge amount by the second ink jet head, for example, is a ratio of the amount of ink which is discharged to an area to be printed with the expression color. The discharge rate, for example, may be a ratio of the number of dots formed by the first ink jet head to the number of dots formed by the second ink jet head as to the line of the dots of ink formed in the predetermined area. In addition, as to the first color and the second color, the color of the same color type as the expression color is a color, for example, in which the color differences $\Delta E$ between the expression color and these colors are small enough and which is usually judged as the same color type by a person skilled in the art.

Configuration 2

In the printing apparatus according to the aspect of the present disclosure, the color difference $\Delta E$ between the first color and the second color may be within 25.0. By configuring in this manner, for example, the color of the same color type can be appropriately used as the first color and the second color. In addition, by doing so, it is possible to more appropriately perform printing by the desired expression color.

Moreover, the upper limit of the color difference is, for example, the difference in color of the degree capable of being distinguished by a system color name which is subdivided, and is the color difference of the degree which becomes an image of another color name when exceeding this degree. The above-mentioned color difference ΔE between the first color and the second color, for example, may be the color difference within the Class-D allowable difference defined in JIS standard (for example, a standard of JIS D 0202, JIS E 3701, JIS Z 8102, JIS Z 9101, JIS Z 9102 and JIS Z 9107, or the like).

In addition, the color difference ΔE between the first color and the second color is more preferably within 13.0 (within the Class-C allowable difference). The upper limit of the color difference is, for example, the color difference which is equivalent to one rate of the JIS standard colour chart, the Munsell colour chart, or the like. In addition, it is also considered that, for example, in a case where the particularly precise adjustment is performed as to a color expressed on the medium, the color difference ΔE between the first color and the second color is set to within 6.5 which is a range capable of being treated as the same color at a usual impression level (within the Class-B allowable difference) or within 3.2 which is the level of the color difference which is hardly recognized when comparing the separation of the color (within the Class-A allowable difference). In addition, it is also considered that, for example, the color difference ΔE between the first color and the second color is set to within 1.6 which is the level capable of slightly feeling the color difference when comparing the adjacency of the color (within the Class-AA allowable difference), or the like, as necessary. Also, in these cases, the color of the same color type can be appropriately used as the first color and the second color. In addition, in doing so, it is possible to more appropriately perform printing with the desired expression color.

Configuration 3

In the printing apparatus according to the aspect of the present disclosure, the color difference ΔE between the first color and the second color may be 0.8 or more. By configuring in this manner, for example, it is possible to appropriately use inks in which the colors are different as ink of the first color and ink of the second color. In addition, in so doing, for example, it is possible to more appropriately perform the adjustment to the desired expression color as to the color which is printed on the medium.

Moreover, the lower limit of the color difference is, for example, the color difference of the limit capable of setting a tough standard of the allowable color difference in view of the reproducibility of the visual judgment (the Class-AAA allowable difference). In addition, it is preferable that the color difference ΔE between the first color and the second color be set to a range in accordance with, for example, the allowable color difference with respect to the expression color, a range of the required adjustment with respect to the printed color, or the like.

For example, in a case of performing a certain degree or more of adjustment with respect to the printed color, the color difference ΔE between the first color and the second color is preferably set to 1.6 or more. In addition, the color difference ΔE between the first color and the second color may be set to 3.2 or more or 6.5 or more, as necessary. In addition, it is also considered that the color difference ΔE between the first color and the second color is set to, for example, 13.0 or more, depending on the purpose of printing.

Configuration 4

In the printing apparatus according to the aspect of the present disclosure, a third ink jet head that discharges ink droplets of ink of a third color which is a color of the same color type as the expression color and is different from the first color and the second color may be further included. By configuring in this manner, for example, it is possible to more appropriately perform the adjustment to the desired expression color as to the color which is printed on the medium.

Configuration 5

In the printing apparatus according to the aspect of the present disclosure, a color detection sensor that detects at least any of the color of the medium or the color which is printed on the medium may be further included, in which the discharge rate is calculated based on at least any of the color of the medium or the color which is printed on the medium which is detected by the color detection sensor. By configuring in this manner, for example, it is possible to more appropriately perform the adjustment of the color which is printed on the medium. In addition, by doing so, it is possible to more appropriately perform printing with the desired expression color.

Configuration 6

In the printing apparatus according to the aspect of the present disclosure, a position of the medium on the printing apparatus may be further detected by the color detection sensor. By configuring in this manner, for example, it is possible to appropriately use the color detection sensor as a sensor for detecting a position of the medium. In addition, by doing so, it is possible to appropriately reduce the cost of the printing apparatus.

Configuration 7

In the printing apparatus according to the aspect of the present disclosure, the medium may be a medium in which a color shade of a surface to be printed is a color shade reflecting an original color of a natural product. This medium may be, for example, a processed good of a natural product, or the like in which the texture of the natural product is remained on the surface to be printed. In addition, the printing apparatus is performed printing, for example, in state in which an area to be printed of the medium is not completely covered by ink and the texture of the surface to be printed of the medium is reflected.

In a case where printing is performed on the medium using the ink jet method, the color which is printed on the medium usually becomes a color synthesized by the color of ink with the color of the medium. Therefore, in a case where the color shade of the surface to be printed of the medium is a color shade reflecting an original color of a natural product, as a result of which the variation in color of the surface to be printed becomes large, even if printing is performed with ink of the same color, the variation in color which is printed on the medium usually becomes large.

In contrast, by configuring in this manner, for example, it is possible to appropriately perform the adjustment of the color which is printed on the medium, in accordance with the variation in color of the surface to be printed of the medium. In addition, by doing so, it is possible to more appropriately perforin printing with the desired expression color.

Configuration 8

In the printing apparatus according to the aspect of the present disclosure, the medium may be a processed good of natural leather. In such a case, it is considered that the variation in color of the surface to be printed becomes large. In contrast, by configuring in this manner, for example, it is possible to appropriately perform the adjustment of the color which is printed on the medium in accordance with the variation in color of the surface to be printed of the medium. In addition, by doing so, it is possible to appropriately perform printing with the desired expression color.

Moreover, the printing apparatus performs printing, for example, so that the dots of ink are discretely lined up, for example, with respect to an area to be printed of the medium of natural leather. By configuring in this manner, it is possible to appropriately perform printing in which the texture of natural leather is retained. In addition, in this case, it is possible to appropriately realize the desired expression color by a synthesis of the color of natural leather with the color of ink, for example, by appropriately performing the adjustment of the color which is printed on the medium.

Configuration 9

In the printing apparatus according to the aspect of the present disclosure, each ink of the first color and ink of the second color may be ink which is manufactured by mixing two inks or more of a cyan color (C), a magenta color (M), a yellow color (Y) and a black color (K) in advance. By configuring in this manner, for example, it is possible to appropriately manufacture inks of the first color and the second color by using general inks which are widely used. In addition, by doing so, it is possible to appropriately reduce the cost of ink.

Configuration 10

According to another aspect of the present disclosure, there is provided a printing method of performing printing using an ink jet method with respect to a medium, including discharging ink droplets of ink of a first color which is a color of the same color type as an expression color which is a color that is set as a color to be expressed by printing in advance, by a first ink jet head; discharging ink droplets of ink of a second color which is a color of the same color type as the expression color and is different from the first color, by a second ink jet head; and controlling a discharge of ink droplets by each of the first ink jet head and the second ink jet head, in which the control of the discharge of ink droplets makes the first ink jet head and the second ink jet head perform printing with the expression color on the medium by setting a ratio of the discharge amount of discharging ink of the first color by the first ink jet head on the medium to the discharge amount of discharging ink of the second color by the second ink jet head on the medium to a discharge rate which is calculated in advance. By configuring in this manner, for example, it is possible to obtain the similar effect as Configuration 1.

According to the present disclosure, for example, it is possible to appropriately perforin printing with the desired expression color.

BRIEF DESCRIPTION OF THE DRAWINGS

FIGS. 1A and 1B are a front view and a top view showing an example of a configuration of a main part of the printing apparatus. FIG. 1C is a diagram showing an example of a printing result by the printing apparatus of the present example.

FIGS. 2A and 2B show an example of a state enlarging an area on which ink is landed on a medium. FIG. 2C is a diagram illustrating an adjustment of a color which is printed on the medium.

DETAILED DESCRIPTION OF THE DISCLOSURE

Figure 1A:
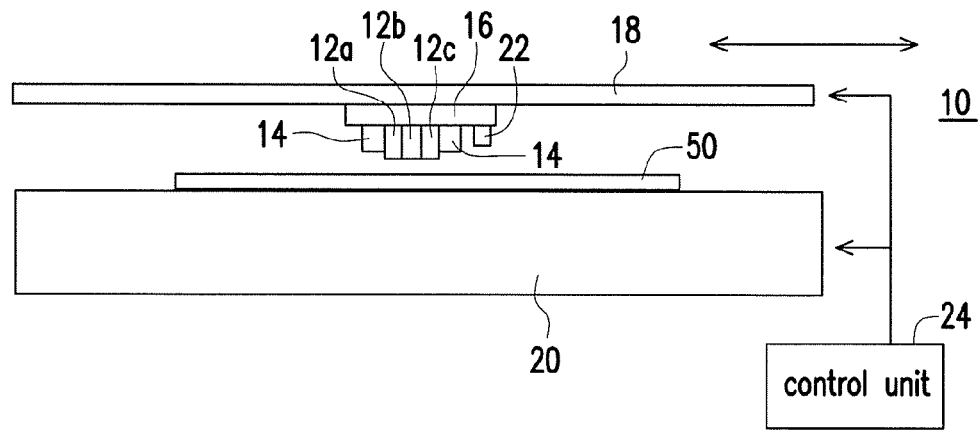
FIGS. 1A to 1C are diagrams showing an example of a configuration of a printing apparatus according to an embodiment of the present disclosure.

In recent years, the use of the ink jet printer has been broadened to various fields. As to the printing quality that is required, a case of requiring high accuracy in various ways has come up as the use is broadened. For example, in a case of printing designs such as corporate colors or trademarks which are characterized by colors, or the like, there are cases when it is required that printing with a specific color specified in advance is performed with high accuracy. In addition, in a case of performing such printing, or the like, there are also cases when it is further required that a medium having large variation of a basic color of a surface to be printed is used and a state that is matched to a specific color after printing.

In contrast, for example, in a case where printing is performed using CMYK inks as the usual ink jet printer in the related art, it is also considered that the adjustment of color after printing seems to have to be performed by adjusting each discharge amount of CMYK inks. However, in a case where color printing is performed using CMYK inks, various colors are expressed by a synthesis of inks of each color of CMYK inks in which each other's colour differences are large. Therefore, even if the adjustment of the color difference is performed with high accuracy with respect to the desired specific color, the adjustment is not likely to be performed with sufficient accuracy.

In addition, in a case where color printing is performed using CMYK inks, when the printed area is enlarged and observed, not the desired specific color but a state in which the dots of inks of each color of CMYK inks are lined up is observed. Therefore, in a case of observing the state from the adjacent position, an impression in which printing is not performed with the desired specific color is likely to occur.

Furthermore, in the ink jet printer, performing printing in both the going path and the returning path of the main scanning operation of an ink jet head (the scanning operation) has been widely performed. Then, in this case, when color printing is performed using CMYK inks, the orders in which the dots of inks of each color are overlapped are different between an area printed in the going path and an area printed in the returning path of the ink jet head. In addition, as a result, also, as to the colors which are observed, there are cases when a slight difference occurs. Therefore, on these points, in a case where color printing is performed using CMYK inks, the adjustment is not likely to be performed with sufficient accuracy as to the adjustment of the color difference with high accuracy.

In addition, a problem relating to such an adjustment of color occurs particularly easily in a case where printing is performed with respect to the medium having large variation of the basic color of the surface to be printed. Then, in order to suppress an effect of the basic color of the surface to be printed, for example, it is also considered to avoid an occurrence of an effect of the basic color of the medium by performing printing as if an area to be printed of the medium is completely covered by ink using a large quantity of ink, ink having high concentration, or the like.

However, there are cases when it is required that the texture of the surface to be printed of the medium is retained, depending on the purpose of printing. For example, in a case where a processed good of a natural product or the like is used for the medium, there are cases when it is required that printing retaining the texture of a natural product is performed. Therefore, in such a method, the texture of the surface to be printed of the medium is completely concealed and thus it is difficult to perform printing having the desired quality. Therefore, an object of the present disclosure is to provide a printing apparatus and a printing method which can solve the problem described above.

Figure 1B:
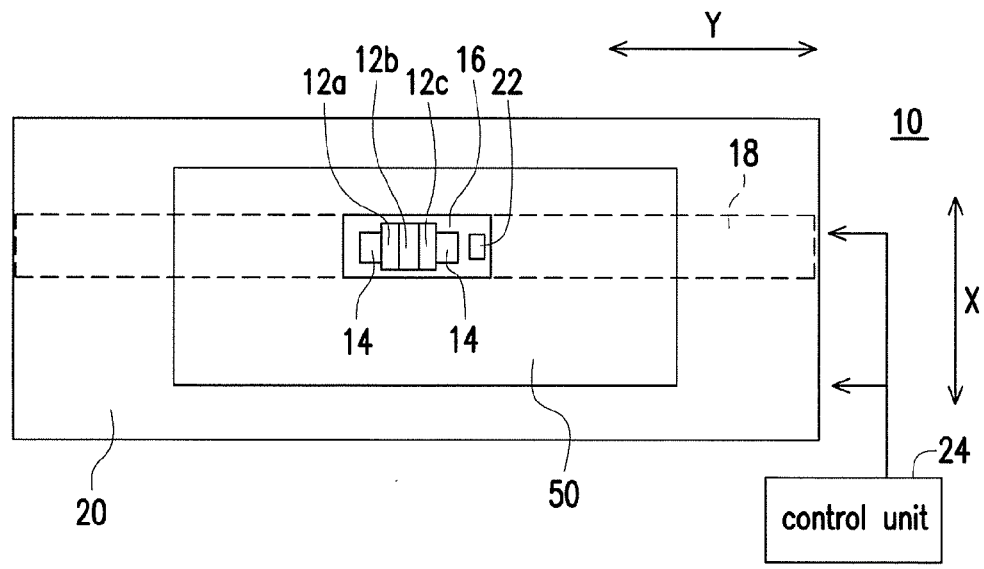
Figure 1C:
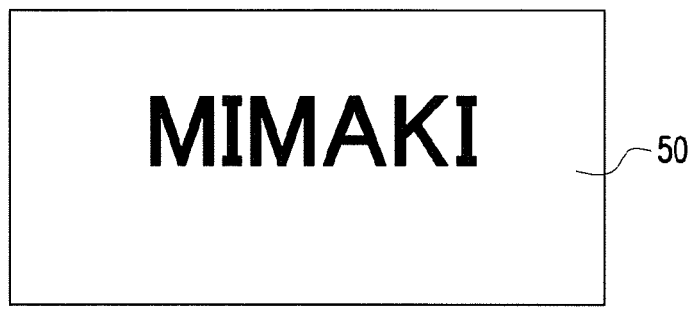

Hereinafter, description will be given of an embodiment according to the present disclosure with reference to the drawings. FIGS. 1A to 1C show an example of a configuration of a printing apparatus 10 according to an embodiment of the present disclosure. FIGS. 1A and 1B are a front view and a top view showing an example of a configuration of a main part of the printing apparatus 10. In the present example, the printing apparatus 10 is an ink jet printer in which printing is performed with respect to a medium 50 using an ink jet method, and is provided with at least a plurality of ink jet heads 12a to 12c, an ultraviolet ray irradiation unit 14, a carriage 16, a guide rail 18, a table 20, a sensor unit 22 and a control unit 24. In addition, in the present example, the medium 50 to be targeted for printing is, for example, a medium in which the color shade of the surface to be printed is a color shade reflecting an original color of a natural product is used. More specifically, the medium 50 is, for example, a medium of a processed product of natural leather (for example, a medium of suede tone leather).

The plurality of ink jet heads 12a to 12c are each a print head that discharges ink droplets using the ink jet method. In addition, in the present example, the ink jet heads 12a to 12c could be referred to as a first to a third ink jet heads and respectively discharge ink droplets of colors of the same color type as the expression color which is a color that is set as a color to be expressed by printing in advance and colors which are different from each other. For example, the ink jet head 12a discharges ink droplets of ink of a first color which is a color of the same color type as the expression color. In addition, the ink jet head 12b discharges ink droplets of ink of a color of the same color type as the expression color and a second color which is different from the first color. The ink jet head 12c discharges ink droplets of ink of a third color which is a color of the same color type as the expression color and is different from the first color and the second color.

Here, a color of the same color type as the expression color, for example, is a color in which the color differences ΔE between the expression color and these colors are small enough and which is usually judged as the same color type by a person skilled in the art. In addition, the difference in color among the first to the third inks means that, for example, the substantial difference in color due to being beyond the range of the variation or the like generated when manufacturing inks, or the like. The substantial difference in color means that, for example, a state in which the difference in color can be judged with accuracy in accordance with purposes of performing the adjustment of a color described later in detail by a person skilled in the art. As to the difference in color of each ink, description in further detail will be given later.

In addition, each of the first and the third inks may be, for example, ink which is manufactured by mixing two inks or more of a cyan color (C), a magenta color (M), a yellow color (Y) and a black color (K) in advance. These inks, for example, are respectively supplied to the ink jet heads 12a to 12c from an ink cartridge, an ink bottle, or the like. By configuring in this manner, for example, it is possible to appropriately manufacture inks of the first to the third colors using general inks which are widely used. In addition, by doing so, it is possible to appropriately reduce the cost of ink.

In addition, in the present example, as inks which are discharged from the ink jet heads 12a to 12c, for example, solvent UV ink can be suitably used. Solvent UV ink is, for example, ink having a configuration in which UV ink (ultraviolet ray curable type ink) is diluted by an organic solvent. The configuration in which UV ink is diluted by an organic solvent is, for example, a configuration in which an organic solvent is further added to a usual UV ink component including a monomer, oligomer, or the like. It is also considered that, for example, usual UV ink, solvent ink, and the like are used as ink which is discharged from the ink jet heads 12a to 12c.

The ultraviolet ray irradiation unit 14 is a light source of an ultraviolet ray and irradiates the dots of ink which are formed on the medium 50 with an ultraviolet ray in a case where solvent UV ink or UV ink is used as ink. By doing so, ink on the medium 50 is cured by the ultraviolet ray irradiation unit 14.

The carriage 16 is a member which makes the plurality of ink jet heads 12a to 12c and the ultraviolet ray irradiation unit 14 face the medium 50. In addition, in the present example, the carriage 16 further retains the sensor unit 22 by facing the medium 50.

The guide rail 18 is a rail member which extends in the Y direction (the main scanning direction) which is set in advance in the printing apparatus 10, and the guide rail 18 ensures that the printing apparatus 10 performs the main scanning operation during a printing operation by retaining the carriage 16 so as to be able to move in the Y direction. The main scanning operation, for example, is an operation in which the plurality of ink jet heads 12a to 12c discharge ink droplets while moving in the Y direction.

In addition, the guide rail 18 makes the printing apparatus 10 perform the sub-scanning operation by moving in the X direction (the sub-scanning direction) perpendicular to the Y direction with respect to the medium 50. The sub-scanning operation is an operation, for example, in which the ink jet heads 12a to 12c relatively move in the X direction with respect to the medium 50 in the intervals of the main scanning operation. In the sub-scanning operation, the printing apparatus 10, for example, makes the ink jet heads 12a to 12c relatively move in the X direction with respect to the medium 50 by moving the guide rail 18. In addition, in the sub-scanning operation, the printing apparatus 10 may make the side of the medium 50 move by fixing the positions of the guide rail 18 and the ink jet heads 12a to 12c. In this case, the printing apparatus 10, for example, makes the ink jet heads 12a to 12c relatively move in the X direction with respect to the medium 50 by moving the table 20.

The table 20 is a table-like member on which the medium 50 is placed. In the present example, the table 20 retains the medium 50 facing the ink jet heads 12a to 12c by the medium 50 being placed on the top surface.

The sensor unit 22 is a sensor that further detects the position of the medium 50 on the printing apparatus 10, and, for example, detects the position of the medium 50 on the table 20 by irradiating toward the table 20 with light and detecting the reflected light. In addition, in the present example, the sensor unit 22 further has a function of a color detection sensor, and detects at least any of the color of the medium 50 or the color which is printed on the medium 50, in addition to the position of the medium 50. The color which is printed on the medium 50 is, for example, a color which is actually expressed with inks discharged by the ink jet heads 12a to 12c on the medium 50. The color which is actually expressed on the medium 50 is, for example, a color which is expressed by a synthesis of an original color of the medium 50 with the color of ink. Moreover, in a modification example of a configuration of the printing apparatus 10, for example, a color detection sensor may be provided, apart from a sensor that detects the position of the medium 50.

The control unit 24 is, for example, a CPU of the printing apparatus 10 and controls the operations of each unit in the printing apparatus 10. For example, the control unit 24 makes the printing apparatus 10 perform the main scanning operation and the sub-scanning operation by controlling the operations of each unit in the printing apparatus 10. By doing so, the printing apparatus 10 performs printing with respect to each part on the medium 50.

In addition, in the present example, the control unit 24 further performs the adjustment of the color which is printed on the medium 50 by controlling the discharge amount of ink droplets by the plurality of the ink jet heads 12a to 12c. More specifically, the control unit 24 makes the ink jet heads 12a to 12c perform printing with the desired expression color on the medium 50 by setting a ratio of the discharge amount of inks which are discharged onto the medium 50 by each of the ink jet heads 12a to 12c to the discharge rate which is calculated in advance.

Here, the discharge rate of the discharge amount by the ink jet heads 12a to 12c is, for example, a ratio of the amount of inks which are discharged to an area to be printed with the expression color by each of the ink jet heads 12a to 12c. The discharge rate is, for example, may be a ratio of the number of dots respectively formed by the ink jet heads 12a to 12c, as to the line of the dots of ink formed in the predetermined area.

In addition, the discharge rate is, for example, calculated based on at least any of the color of the medium 50 or the color which is printed on the medium 50 which is detected by the sensor unit 22. The color which is printed on the medium 50, for example, may be a color which is actually expressed on the medium 50 in a case where printing of a test pattern (a test printing) which is set in advance is performed. In addition, the calculation of the discharge rate, for example, may be performed using a computer or the like of the outside of the printing apparatus 10. In addition, the calculation of the discharge rate, for example, may be performed per performance of a certain amount of printing such as per lot in a printing step. By configuring in this manner, for example, it is possible to appropriately perform the adjustment of the color per unit of printing in a certain amount. In addition, by doing so, it is possible to effectively perform the adjustment of the color.

FIG. 1C is a diagram showing an example of a printing result by the printing apparatus 10 of the present example, and shows a state in which the letters as MIMAKI are printed on the medium 50. In the present example, as described above, it is possible to appropriately perform printing with respect to each part of the medium 50. In addition, for example, it is possible to appropriately perform the adjustment of the color which is printed on the medium 50 by using inks of the first to the third colors which are different from each other. In addition, as to the discharge rate by each of the ink jet heads 12a to 12c, for example, it is possible to appropriately match the color which is printed on the medium 50 with the desired expression color by setting to the discharge rate calculated in advance based on the color of the medium 50 or the result of a test printing.

Here, the color which is printed on the medium 50 becomes a color which is synthesized by the color of ink with the color of the medium 50. Therefore, as the present example, in a case where the color shade of the surface to be printed of the medium 50 is a color shade reflecting an original color of a natural product, as a result in which the variation in color of the surface to be printed becomes large, even if printing is performed with ink of the same color, it is considered that the variation in color which is printed on the medium 50 becomes large. In contrast, according to the present example, for example, it is possible to appropriately perform the adjustment of the color which is printed on the medium 50 in accordance with the variation in color of the surface to be printed of the medium 50. In addition, by doing so, it is possible to appropriately perform printing with the desired expression color.

In addition, the printing apparatus 10 may be performed printing, for example, in state in which an area to be printed of the medium 50 is not completely covered by ink and the texture of the surface to be printed is reflected. In this case, the printing apparatus 10 performs printing, for example, so that the dots of ink are discretely lined up, for example, with respect to an area to be printed of the medium 50 of natural leather. By configuring in this manner, it is possible to appropriately perform printing in which the texture of natural leather is retained. In addition, also, in this case, according to the present example, for example, it is possible to appropriately perform the adjustment of the color which is printed on the medium 50 in accordance with the variation in color of the surface to be printed of the medium 50. In addition, in doing so, it is possible to more appropriately perform printing with the desired expression color by a synthesis of the color of natural leather with the color of ink.

Moreover, except the points explained in the above, the printing apparatus 10 may be the same as or similar to a well known ink jet printer. For example, as to the point except ink which is used, a part of the control of the control unit 24 with respect to the ink jet heads 12a to 12c, or the like, the printing apparatus 10 in the present example may have a configuration the same as or similar to UJF-3042 type or UJF-6042 type ink jet printer manufactured by MIMAKI ENGINEERING CO., LTD.

In addition, the printing apparatus 10 may be further provided with a configuration similar to a well-known ink jet printer as various configurations which are required for the operation of printing. For example, in a case where solvent UV ink is used as ink which is discharged from the ink jet heads 12a to 12c, the printing apparatus 10 is preferably further provided with a heater which heats the medium 50. The heater, for example, makes an organic solvent from ink evaporate after landing on the medium 50 by being provided in the table 20. By configuring in this manner, for example, it is possible to appropriately suppress occurring bleeding as to the dots of ink formed by the plurality of ink jet heads 12a to 12c. In addition, by doing so, for example, it is possible to more appropriately perform the adjustment of the color which is printed on the medium.

Figure 2A:
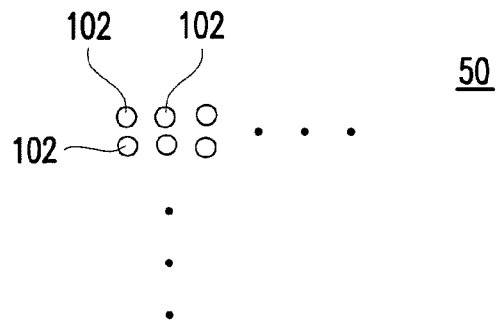
FIGS. 2A to 2C are diagrams illustrating an adjustment of a color in detail.
Figure 2B:
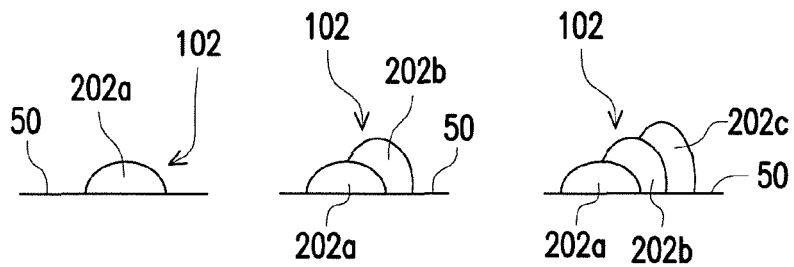
Figure 2C:
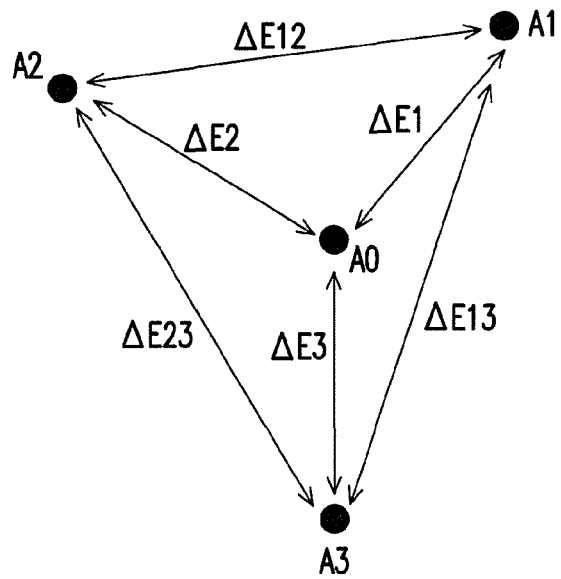

Subsequently, description will be given of the adjustment of the color performed in the present example in more detail. FIGS. 2A to 2C are diagrams illustrating an adjustment of a color in detail. FIGS. 2A and 2B show an example of a state enlarging an area in which ink is landed on the medium 50.

In a case where printing is performed using the ink jet method, printing is performed so that ink is landed at the position of each pixel 102 of an image which is printed on the medium 50, as shown in FIG. 2A. In doing so, the dots of ink are formed at the position of the required pixel 102 in accordance with an image which is printed. In addition, in a case where printing is performed using the plurality of ink jet heads 12a to 12c, one or a plurality of dots of ink are formed at the position of the pixel 102 in which the dots of ink are formed, as the printing apparatus 10 explained using FIG. 1.

For example, the diagram on the left side of FIG. 2B shows a state in which one dot 202a is formed at the position of one pixel 102 by the ink jet head 12a. In addition, the diagram at the center of FIG. 2B shows a state in which two dots 202a and 202b are formed at the position of one pixel 102 by the ink jet heads 12a and 12b. The diagram on the right side of FIG. 2B shows a state in which three dots 202a to 202c are formed at the position of one pixel 102 by the ink jet heads 12a to 12c.

Here, as described above, forming one or a plurality dots of ink at the position of each pixel is also the similar as a case where printing is performed using inks of each color of CMYK, for example, as a conventional ink jet printer. Therefore, in a case where color printing is performed using CMYK inks, dots of not inks of color to be expressed by printing but inks of CMYK are formed at the position of each pixel. In addition, as a result, in a case where color printing is performed using CMYK inks, when an area which is printed is enlarged and observed or observed from the adjacent position, an impression in which printing is not performed with the desired specific color is likely to occur.

In addition, in the ink jet printer, performing printing in both the going path and the returning path of the main scanning operation of the ink jet head (the scanning operation) has been widely performed. Then, in this case, when color printing is performed using CMYK inks, the orders in which the dots of inks of each color are overlapped are different between an area printed in the going path and an area printed in the returning path of the ink jet head. In addition, as a result, also, as to the colors which are observed, there are cases when a slight difference occurs.

In contrast, in the present example, the ink jet heads 12a to 12c discharge ink droplets of the color of the same color type as the expression color, as explained in association with FIG. 1. Therefore, for example, even if an area which is printed is enlarged and observed, an impression in which the dots of inks of other colors are lined up is not likely to occur. In addition, for example, even in a case of observing the state from the adjacent position, it is possible to give an impression in which printing is appropriately performed with the expression color. Furthermore, since a plurality of inks of the same color type are used, also, in a case where the dots of a plurality of inks are overlapped at the position of the pixel 102, a problem in which the difference in colors which are observed occurs, depending on the orders overlapped is not likely to occur.

In addition, in the present example, since a plurality of inks of the same color type are used, for example, even if each ink are mixed on the medium 50, an impression of bleeding or the like is not likely to occur. In addition, as a result, for example, even if the dots of ink are sufficiently flattened (smoothed), a problem of bleeding is not likely to occur. Therefore, according to the present example, for example, it becomes also possible to appropriately perform printing with gloss feeling, or the like by appropriately flattening the dots of ink. According to the present example, for example, it is possible to more appropriately perform printing with the desired expression color, compared with a case of using CMYK inks.

In addition, in the present example, the adjustment of the color which is printed on the medium 50 is performed by further controlling the discharge amount of ink droplets by the plurality of ink jet heads 12a to 12c, as explained in association with FIG. 1. FIG. 2C is a diagram illustrating an adjustment of a color which is printed on the medium 50 and shows an example of a relationship on a color space between colors A1 to A3 of inks which are discharged from the ink jet heads 12a to 12c and a desired expression color A0.

In the present example, the ink jet head 12a discharges ink droplets of ink of a color A1, for example, which is a color of the same color type as the expression color A0 and in which the color difference between the expression color A0 and the color A1 is $\Delta E1$, as ink droplets of ink of the first color. In addition, the ink jet head 12b discharges ink droplets of ink of a color A2, for example, which is a color that is the same color type as the expression color A0 and is different from the color A1, and in which the color difference between the expression color A0 and the color A2 is $\Delta E2$, as ink droplets of ink of the second color. The ink jet head 12c discharges ink droplets of ink of a color A3, for example, which is a color that is the same color type as the expression color A0 and is different from the color A1 and the color A2, and in which the color difference between the expression color A0 and the color A3 is $\Delta E3$, as ink droplets of ink of the third color.

Moreover, inks of the colors A1 to A3, for example, may be inks in which the colors in a state being fixed on the medium 50 become A1 to A3. In addition, in the present example, the colors A1 to A3 are set so that the expression color A0 is entered in an area surrounded by the points showing the colors A1 to A3 on a color space.

In addition, the control unit 24 of the printing apparatus 10 perform the adjustment of the color which is printed on the medium 50 by controlling the discharge amount of ink droplets by the plurality of ink jet heads 12a to 12c, as explained in association with FIG. 1. In this case, as it can be noticed from FIG. 2C, or the like, it becomes possible to adjust the color, which is printed on the medium 50, in an area surrounded by the points showing the colors A1 to A3 on a color space. Therefore, according to the present example, it is possible to appropriately adjust the color which is printed on the medium 50 to the desired expression color A0.

Here, it is also considered, for example, to perform expressing using CMYK inks as to expressing the desired color using inks of the colors of a plurality of different colors. However, in this case, the color differences between inks of each color of CMYK inks become much larger, compared with the colors A1 to A3 described above. In addition, the color difference between the color of ink which is used and the desired expression color also becomes larger, compared with the present example. Therefore, in a case where color printing is performed using CMYK inks, as to the adjustment of the color difference with high accuracy, there is a possibility that the adjustment with sufficient accuracy can not be performed.

In contrast, in the present example, for example, it is possible to appropriately perform the adjustment of the color which is printed on the medium 50 with higher accuracy by using inks of the colors A1 to A3 of the same color type as the desired expression color A0. Therefore, according to the present example, for example, it is possible to appropriately perform printing with the desired expression color with high accuracy.

In addition, in the present example, it is also possible to appropriately suppress the variation in colors which is generated by characteristics of each kind of machine (the machine difference) of the printing apparatus 10, by performing such an adjustment of the color. Therefore, according to the present example, it is also possible to appropriately perform printing with the desired expression color with high accuracy in this point.

Here, it is preferable that the color differences $\Delta E$ between each color A1 to A3 (hereinafter, referred to as the color difference between inks), for example, be set to within 25.0 which is the difference in color of the degree capable of being distinguished by a system color name which is subdivided. The color difference between inks, for example, means each color difference of the color difference $\Delta E12$ between the color A1 and the color A2, the color difference $\Delta E13$ between the color A1 and the color A3, and the color difference $\Delta E23$ between the color A2 and the color A3, as shown in FIG. 2C. By configuring in this manner, for example, it is possible to appropriately use the color of the same color type, as the colors A1 to A3. In addition, by doing so, it is possible to more appropriately perform printing with the desired expression color A0.

Moreover, it is preferable that the color differences between each color A1 to A3 and the expression color A0, for example, be set to the similar as the color differences between the colors. By configuring in this manner, for example, it is possible to appropriately use the color of the same color type as the expression color A0, as the colors A1 to A3.

In addition, the color difference between inks is more preferably within 13.0 which is the color difference which is equivalent to one rate of the JIS standard color chart, the Munsell color chart, or the like. By configuring in this manner, for example, it is possible to perform printing with the desired expression color A0 with higher accuracy. In addition, as to the color which is expressed on the medium 50, for example, in a case where the particularly accuracy adjustment is performed, it is also considered that the color difference between inks is set to within 6.5 which is a range capable of being treated as the same color at a usual impression level or within 3.2 which is the level of the color difference which is hardly recognized when comparing the separation of the color. In addition, it is also considered that, for example, the color difference between inks is set to within 1.6 which is a level capable of feeling slight color difference when comparing the adjacence of the color, or the like, as necessary. In these cases, for example, it is possible to appropriately use the colors of the same color type as the colors A1 to A3. In addition, in doing so, it is possible to more appropriately perform printing with the desired expression color A0.

In addition, it is preferable that the color difference between inks be, for example, 0.8 or more, which is the color difference of the limit capable of setting a tough standard of the allowable color difference in view of the reproducibility of the visual judgment. By configuring in this manner, for example, it is possible to appropriately use inks in which the colors are different as inks of the colors A1 to A3. In addition, in doing so, it is possible to appropriately perform the adjustment to the desired expression color.

In addition, it is preferable that the color difference between inks be set to a range in accordance with, for example, the allowable color difference with respect to the expression color A0, a range of the required adjustment with respect to the printed color, or the like. For example, in a case of performing the adjustment of a certain level or more with respect to the printed color, the color difference between inks is more preferably set to 1.6 or more. In addition, the color difference between inks may be set to 3.2 or more or 6.5 or more, as necessary. In addition, it is also considered that the color difference between inks is set to, for example, 13.0 or more, depending on the purpose of printing.

Figure 3:
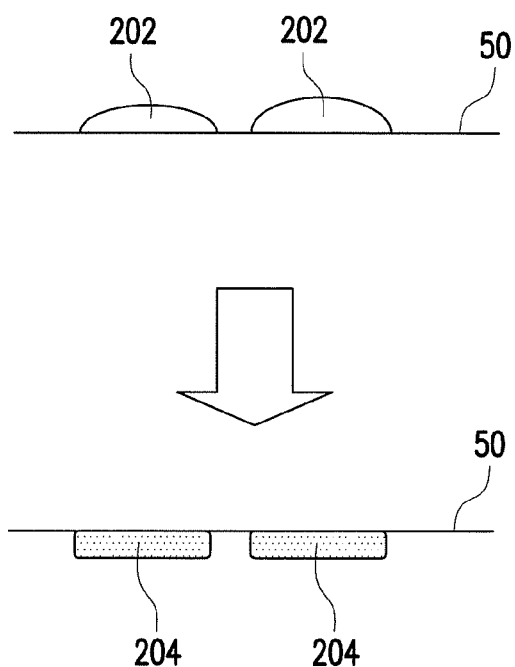
FIG. 3 is a diagram illustrating an example of a treatment performed when a processed product of natural leather or the like is printed on the medium.

Subsequently, description will be given of a required treatment in a case of performing printing onto the medium 50 such as a processed product of natural leather or the like in more detail, as the present example. FIG. 3 is a diagram illustrating an example of a treatment performed when performing printing onto the medium 50 such as a processed product of natural leather or the like.

In a case of performing printing using the ink jet method, ink discharged to the medium 50 is usually fixed with a dot form like the dot 202 on the surface of the medium 50, as shown the upper side of FIG. 3. However, in a case of performing printing onto the medium 50 such as a processed product of natural leather or the like, when ink is fixed in such a state, ink from the surface of the medium 50 is also likely to be peeled. For example, in a case where a tape is put on the printed surface of the medium 50, afterward, the tape is peeled, the dot 202 of ink is also likely to be peeled.

Therefore, in a case where printing is performed onto such a medium 50, it is preferable to perform a post-treatment for more strongly fixing ink. In addition, it is considered that, for example, the surface of the medium 50 is treated by a solvent after printing and ink is dissolved or swelled to make ink penetrate the inside of the medium 50, as such a post-treatment. In addition, afterward, for example, it is also considered that the required water repellent treatment, or the like is performed, or the like.

By configuring in this manner, for example, it is possible to form a penetration part 204 in which ink penetrates the inside of the medium 50, as shown on the lower side of FIG. 3. In addition, by doing so, it is possible to more strongly fix ink with respect to the medium 50. Therefore, by performing such a treatment, for example, it is possible to more appropriately perform printing with the desired expression color with respect to the medium 50 of a processed product of natural leather, or the like.

Here, in a case where such various treatments are performed, the adjustment of the desired expression color, for example, is preferably set to the adjustment as to the color which is expressed at a final stage in which the post-treatment for fixing ink, or the like has been completed. In addition, the treatment performed when performing printing onto the medium 50 such as a processed product of natural leather, or the like is not limited to the above, for example, various well-known pre-treatments, post-treatments, and the like may be performed.

As described above, according to the present example, for example, it is possible to appropriately perform printing with the desired expression color with respect to the medium 50. In addition, by doing so, for example, it also becomes possible to appropriately use a medium or the like, for example, such as a processed product of natural leather, in which the color shade of the surface to be printed is a color shade reflecting an original color of a natural product, or the like, as the medium 50.

In addition, in the above, description was given of the configuration (mono-color printing) in a case of considering only one color as the expression color. However, the configuration and the method of the present example, for example, can be also applied to a case of using two colors or more (multi-color printing) as the expression color.

For example, in a case where multi-color printing is performed, it is considered that a plurality of ink jet heads which discharge ink droplets of the color of the same color type are used as to a plurality of expression colors, respectively. More specifically, for example, a configuration in which a plurality of ink jet heads which discharge ink droplets of the color which is the same color type as one expression color and is different from each other with respect to one expression color are provided, furthermore, a plurality of ink jet heads which discharge ink droplets of the color which is the same color type as other expression color and is different from each other with respect to other expression color are provided, is considered. By configuring in this manner, for example, it is possible to appropriately perform multi-color printing with a plurality of expression colors by one machine of the printing apparatus 10.

In addition, for example, it is also considered that a plurality of machines of the printing apparatus 10 which has a configuration the same as or similar to the configuration which has been explained using FIG. 1 and performs mono-color printing with one color of the expression color are prepared and the expression colors printed by each printing apparatus 10 are made different. By configuring in this manner, for example, it is possible to appropriately perform multicolor printing with a plurality of expression colors by a printing system using a plurality of machines of the printing apparatus 10.

As mentioned above, the present disclosure has been described using the embodiment, however, the technical scope of the present disclosure is not limited to the scope described in the embodiment described above. It is apparent to those skilled in the art that various modifications or improvements can be made to the embodiment described above. It is apparent from the description of the scope of the claim that the form in which such modifications or improvements are made can be also included in the technical scope of the present disclosure.

The present disclosure can be appropriately applied to a printing apparatus.

What is claimed is:

1. A printing apparatus that performs printing using an ink jet method with respect to a medium, comprising:
    a first ink jet head that discharges ink droplets of ink of a first color which is a color of the same color type as an expression color which is a color that is set as a color to be expressed by printing in advance;
    a second ink jet head that discharges ink droplets of ink of a second color which is a color of the same color type as the expression color and is different from the first color; and
    a control unit that controls the discharge of ink droplets by each of the first ink jet head and the second ink jet head,
    wherein the control unit makes the first ink jet head and the second ink jet head perform printing with the expression color on the medium by setting a ratio of a discharge amount of discharging ink of the first color by the first ink jet head on the medium to a discharge amount of discharging ink of the second color by the second ink jet head on the medium to a discharge rate which is calculated in advance.

2. The printing apparatus according to claim 1,
    wherein a color difference ΔE between the first color and the second color is within 25.0.

3. The printing apparatus according to claim 1,
    wherein a color difference ΔE between the first color and the second color is 0.8 or more.

4. The printing apparatus according to claim 1,
    wherein a color difference ΔE between the first color and the second color is between 0.8 and 25.

5. The printing apparatus according to claim 1 further comprising:
    a third ink jet head that discharges ink droplets of ink of a third color which is a color of the same color type as the expression color and is different from the first color and the second color.

6. The printing apparatus according to claim 1, further comprising:
    a color detection sensor that detects at least any of the color of the medium or the color which is printed on the medium,
    wherein the discharge rate is calculated based on at least any of the color of the medium or the color which is printed on the medium which is detected by the color detection sensor.

7. The printing apparatus according to claim 6,
    wherein a position of the medium on the printing apparatus is further detected by the color detection sensor.

8. The printing apparatus according to claim 1,
    wherein the medium is a medium in which a color shade of a surface to be printed is a color shade reflecting an original color of a natural product.

9. The printing apparatus according to claim 1,
    wherein the medium is a processed good of natural leather.

10. The printing apparatus according to claim 1,
    wherein each ink of the first color and ink of the second color is ink which is manufactured by mixing two inks or more of a cyan color (C), a magenta color (M), a yellow color (Y) and a black color (K) in advance.

11. The printing method according to claim 1, further comprising:
    detecting, using a color detection sensor, at least any of the color of the medium or the color which is printed on the medium,
    wherein the discharge rate is calculated based on at least any of the color of the medium or the color which is printed on the medium which is detected by the color detection sensor.

12. The printing method according to claim 11 further comprising:
    detecting a position of the medium by the color detection sensor.

13. A printing method of performing printing using an ink jet method with respect to a medium, comprising:
    discharging ink droplets of ink of a first color which is a color of the same color type as an expression color which is a color that is set as a color to be expressed by printing in advance, by a first ink jet head;
    discharging ink droplets of ink of a second color which is a color of the same color type as the expression color and is different from the first color, by a second ink jet head; and
    controlling a discharge of ink droplets by each of the first ink jet head and the second ink jet head,
    wherein the control of the discharge of ink droplets makes the first ink jet head and the second ink jet head perform printing with the expression color on the medium by setting a ratio of a discharge amount of discharging ink of the first color by the first ink jet head on the medium to a discharge amount of discharging ink of the second color by the second ink jet head on the medium to a discharge rate which is calculated in advance.

14. The printing method according to claim 13,
    wherein a color difference ΔE between the first color and the second color is within 25.0.

15. The printing method according to claim 13,
    wherein the color difference ΔE between the first color and the second color is 0.8 or more.

16. The printing method according to claim 13,
    wherein the color difference ΔE between the first color and the second color is between 0.8 and 25.

17. The printing method according to claim 13, further comprising:
    discharging, using a third ink jet head, ink droplets of ink of a third color which is a color of the same color type as the expression color and is different from the first color and the second color.

18. The printing method according to claim 13,
    wherein the medium is a medium in which a color shade of a surface to be printed is a color shade reflecting an original color of a natural product.

19. The printing method according to claim 13,
    wherein the medium is a processed good of natural leather.

20. The printing method according to claim 13, wherein each ink of the first color and ink of the second color is ink which is manufactured by mixing two inks or more of a cyan color (C), a magenta color (M), a yellow color (Y) and a black color (K) in advance.

* * * * *